(No Model.)  3 Sheets—Sheet 1.
C. H. MURRAY.
FURNACE FOR REDUCING AND DISTILLING ZINC FROM ITS ORES.
No. 333,967.  Patented Jan. 5, 1886.
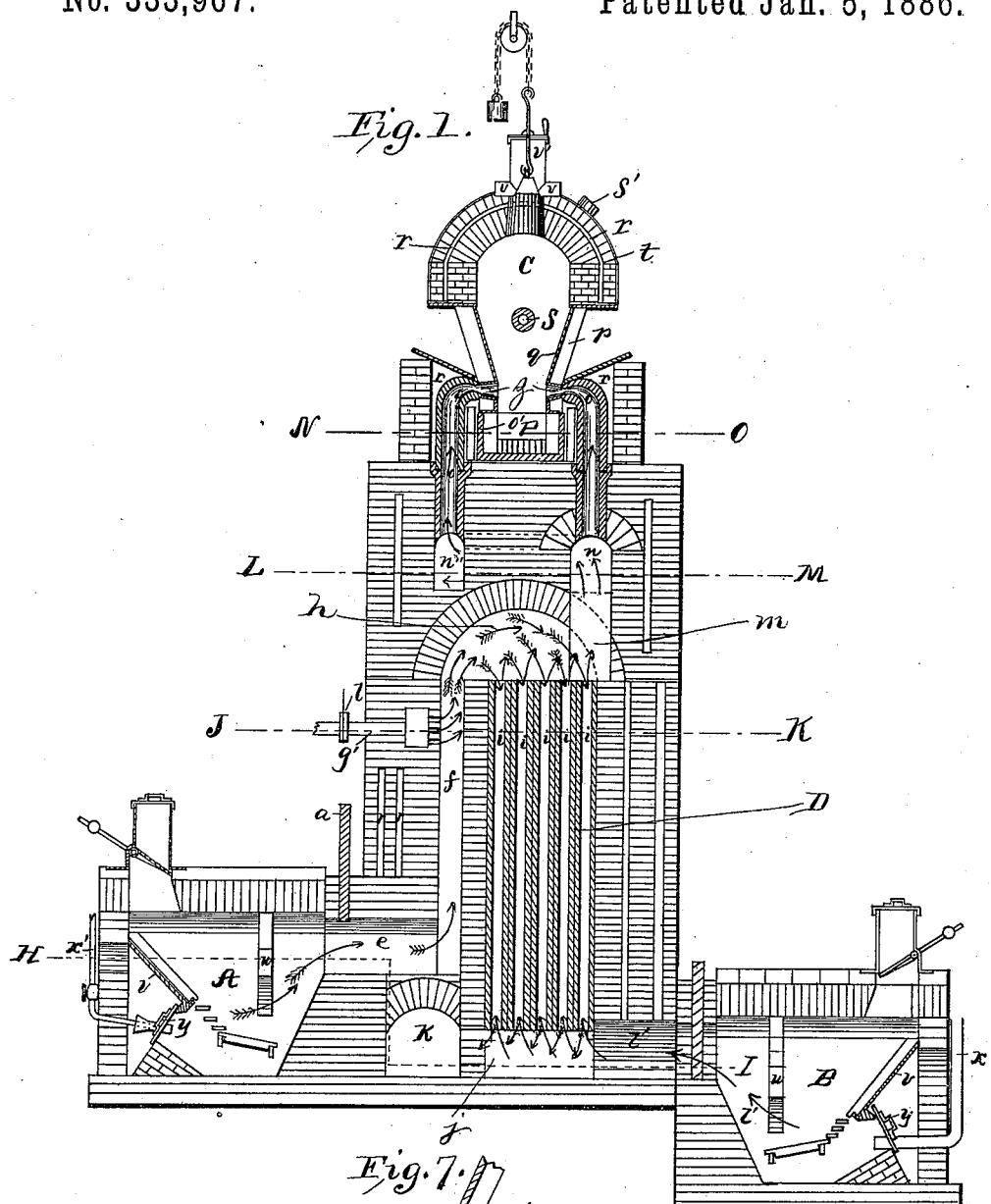
WITNESSES
INVENTOR
Chas. H. Murray
By Myers&Co
Attorneys (No Model.)   3 Sheets—Sheet 2.
C. H. MURRAY.
FURNACE FOR REDUCING AND DISTILLING ZINC FROM ITS ORES.
No. 333,967. Patented Jan. 5, 1886.
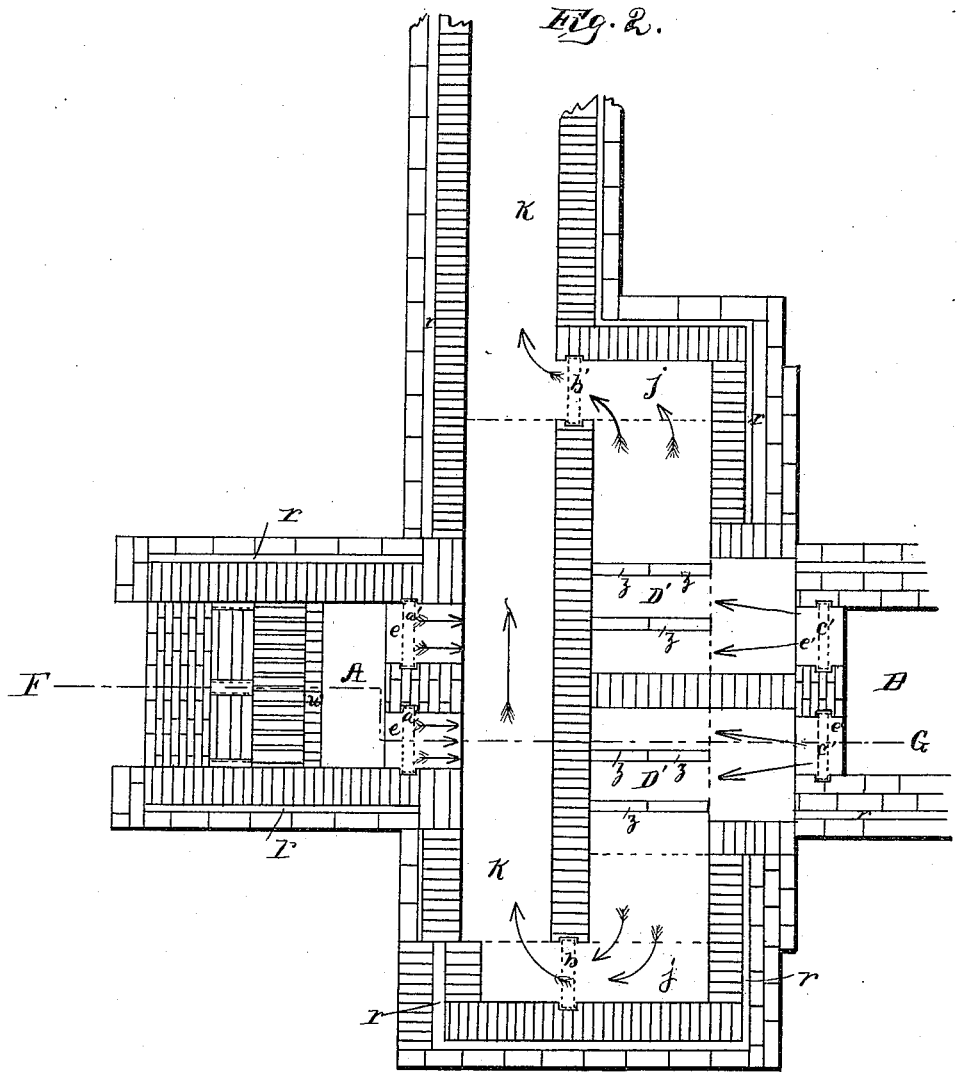
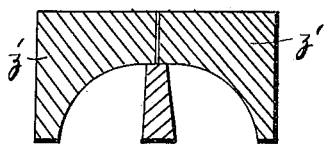

(No Model.) 3 Sheets—Sheet 3.

C. H. MURRAY.
FURNACE FOR REDUCING AND DISTILLING ZINC FROM ITS ORES.

No. 333,967. Patented Jan. 5, 1886.

WITNESSES
INVENTOR
Chas. H. Murray
By Myers
Attorneys.

UNITED STATES PATENT OFFICE.

CHARLES H. MURRAY, OF DENVER, COLORADO, ASSIGNOR OF ONE-HALF TO OSCAR F. MYERS, OF SAME PLACE.

FURNACE FOR REDUCING AND DISTILLING ZINC FROM ITS ORES.

SPECIFICATION forming part of Letters Patent No. 333,967, dated January 5, 1886.

Application filed August 18, 1884. Serial No. 140,884. (No model.)

*To all whom it may concern:*

Be it known that I, CHARLES H. MURRAY, a citizen of the United States, residing at Denver, in the county of Arapahoe, and the State of Colorado, have invented a new and useful furnace for reducing and distilling zinc from its ores, and for reducing and smelting complex ores containing zinc, lead, silver, gold, and copper, and for extracting zinc from ores containing zinc and iron; and I do hereby declare that the following specification, with the accompanying drawings, contains such a full, clear, and distinct description of the invention as will enable others skilled in the art to which it appertains to construct and put in operation the process and appliances.

The object of this invention is to more expeditiously and cheaply reduce and distill zinc from its ores, and to smelt profitably ores containing lead, silver, and gold in combination with zinc, and to save a high per cent. of all these metals. Heretofore the zinc in such ores has been regarded as so serious an obstacle to their reduction as to greatly depreciate their value, and by the methods in vogue the zinc is eliminated or expelled in such manner as to be lost. There is also a grade of ore containing zinc combined with iron that cannot be treated successfully for zinc by present methods, in consequence of the iron attacking and destroying the fire-clay retorts in which the ore is treated. The process herein described remedies this evil, and renders the treatment of such ores practicable and remunerative. Owing to the fact that iron destroys all vessels in which zinc ores containing much iron are treated where high heat is applied to the exterior of the vessel, such a course has been abandoned by me for a process that introduces high heat and a reducing agent into the interior of the vessel holding the ore-charge.

The construction of the furnaces and their various parts for carrying out this process is shown in the accompanying drawings, of which—

Figure 3:
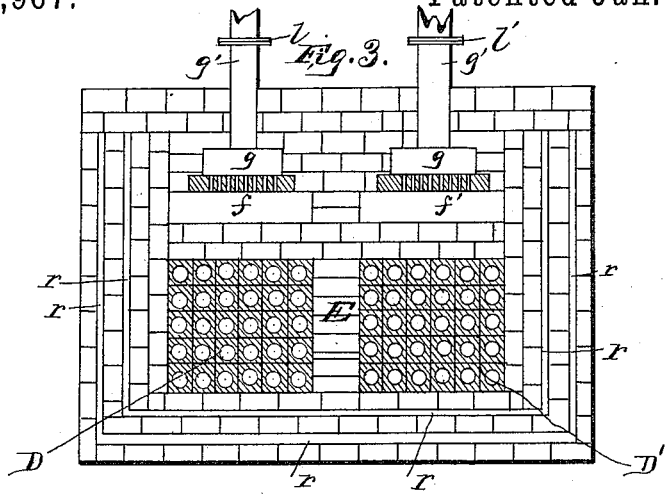
Figure 4:
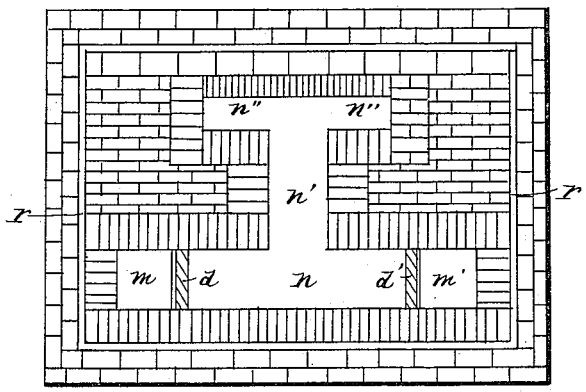
Figure 5:
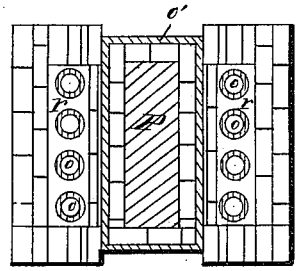

Figure 1 is a vertical cross-section view on the dotted line F G of Fig. 2. Fig. 2 is a horizontal cross-section view on the dotted line H I of Fig. 1. Fig. 3 is a horizontal cross-section view on the dotted line J K of Fig. 1. Fig. 4 is a horizontal cross-section view on the dotted line L M of Fig. 1. Fig. 5 is a horizontal cross-section view on the dotted line N O of Fig. 1. Fig. 6 illustrates the arched tile and pier supports that sustain the flue-tiles, as hereinafter described; and Fig. 7 is a detail view.

In the specification and drawings like letters indicate similar parts throughout.

Referring to the drawings, A and B are two similarly-constructed fuel-consuming furnaces, and C is a retort and smelting-furnace. D and D' are two independent groups of tile-flues, which I call "re-enforcers." They are separated by the partition-wall E, which extends to the top of the dome $h$.

It is found by experiment that when solid fuel is consumed to the reducing gas CO the gas of itself has not or does not retain a sufficiently high temperature to reduce zinc oxide when the gas is forced into a retort containing the latter; hence in order to make carbon monoxide available for such a purpose its temperature has to be raised from some other source. To effect this, coal-slack is fed into the furnace A and burned by the aid of air and steam pressure to an inflammable gas. This passes through either of the flues $e$, up one of the flues $f$, until it encounters the jets of fresh air from the air-box $g$, when it inflames and burns in the dome $h$, making an intense heat. The hot products of combustion then pass down the flue-tiles $i$ $i$ $i$, and from the bottom of these out into the flue $j$, and thence into the exit-flue $k$, to be conducted to the chimney or otherwise. The intense heat produced by the combustion of these gases and their passage through the flues finally brings the latter up to the temperature of dissociation.

In the furnace B is burned anthracite or other good coal-slack. This is burned by a hot or a cold air blast only, no steam being employed, as the purpose of the combustion is to produce as much carbon monoxide as possible and retain it at the highest temperature. The gases in this furnace are produced at such a heat—at least a lemon color—as to prevent as far as possible the formation or retention of any carbon dioxide. The products of this combustion pass through one of the flues $e'$ and then up one group of the previously-heated tile-flues *i i i*. In its passage through these flues and in contact with the dome *h* the carbon monoxide is raised far above its own initial temperature. It then passes through the aperture *m* into the flue *n*, and through *n'* into *n''*, and from these passages it is pressed through the pipes *o o o o* into the furnace C.

The courses of the products from the furnaces A and B are distinguished by those from A being indicated by feathered arrows, and by those of B being unfeathered. These two furnaces are run simultaneously and continuously, and the products of each alternately pass through the flues in D and D' every half-hour. To effect this alternation, there are the gates *a a' b b' c c' d d'*, and also concerned in the operation the valves *l l'*. If the gate *a* is open, so also is the valve *l* and the gate *b* belonging to the A furnace system, and the gates *c'* and *d'* belonging to the B furnace system and all the other gates are shut. Under such an arrangement the products—*i. e.*, the inflammable gases—from A take the course through the D group of tile, and those from B pass through the tile group D'. If all the gates now open are shut and their opposites opened, then the gas products from A and B are reversed, and they respectively pass through the opposite group of tile, those from the A furnace continually passing from the dome *h* downward through one or the other of the tile groups, while the carbon-monoxide gas from the B furnace is simultaneously passing upward through the opposite tile group. The retort and smelting-furnace C is filled with desulphurized or thoroughly-roasted ore in a state of fine granulation. No fuel or other reducing agent than the superheated carbon-monoxide gas under pressure is employed, though I reserve the right to intermix or combine solid fuel with the ore and then treat it with the superheated reducing-gas in any case where such a variation of the method might be found advantageous. The carbon-monoxide gas is forced upward into the retort C by constant pressure through the blast-pipe *x*, connected with the furnace B. From the retort C there are two exit-pipes, S S'. They are both made of fire-clay, their walls or sides being one and a half inch thick. S leads out through the back of the water-jacket and connects exteriorly with any convenient form of condenser. The purpose of this passage is to draw off the metallic fumes where they are densest and convert them into metallic zinc by allowing them to condense in an exterior chamber or condenser maintained at a proper temperature, and from which all free air or oxygen is excluded. The pipe S' is the exit for the gases that are blown into or that are produced in the retort C by the reduction of the ore, a large portion of the carbon monoxide being converted into the dioxide in its passage through the ore. Some of the zinc and lead fumes follow these gases, and such as do are oxidized and caught by means of cooling-chambers exterior to the retort. These are adaptations of means now in vogue, and are not exhibited in the drawings, as they constitute no portion of this specification. The lower part of the retort C is surrounded by an ordinary water-jacket of cast-iron, such as is in customary use.

The appliances for water-supply, &c., are apparent by inspection of the drawings, and require no description, as they do not differ from those ordinarily supplied. The construction of this water-jacket, however, differs from those employed in lead-smelting, in the fact that it is tile-lined, as indicated by the margin *q*. The apertures through which the carbon-monoxide gas is introduced are also thus lined, as indicated. The tile lining of the jacket is one inch thick, and made to fit close to the jacket. It performs an important office when such ores are being treated as contain iron in combination with the zinc, for the temperature of the water-jacket prevents the tile from becoming so heated as to form a combination with the iron, while this lining maintains a higher temperature in the retort than if the ore came into direct contact with the jacket. Below the water-jacket of the retort C there is a lead sump, P, lined with fire-brick, which are held in place in a cast-iron quadrangular kettle, O'. The brick-work of the upper part of C is inclosed in a tight riveted sheet-iron hood, *t*. The retort is fed by a gas-tight hopper with an iron bell-bottom. The iron bell is surrounded by a circular water-jacket, *u*, that protects it. The top of the hopper encircles the lifting-rod attached to the bell. This top is made in two half-circle pieces, the lower half being fixed and the upper half turning smoothly upon it, so that but one half of the top is ever open, which gives sufficient room for feeding. The hopper is always kept full of ore and the half-top open. When it is necessary to feed, the half-top is turned round tight and the bell dropped. After the bell is returned the top is opened and the hopper immediately filled. The bell is ground to the water-jacket, so as to make a gas-tight fit. The feed of the furnaces A and B is also through a hopper that is always kept full. It shuts with a hand-cover on top, and its construction and operation are so apparent as not to require minute explanation. The grate-bars of these furnaces are of two systems, as shown, consisting of step-bars, below which are ordinary inclined bars. Below the hopper and down to the step-bars is a fire-brick bottom supported by a cast-iron frame, *v*. Thrown across these furnaces is a brick apron, *w*, that performs an important office. It is brought lower in the furnace B than in A. Its object is to force any vapor or smoke that forms from the fresh coal to pass down through the incandescent fuel under the arch of this apron, and thereby burn the smoke and purify the gas. In the furnace B the hygroscopic water of the coal is by this means decomposed, and its elements recombine with the carbon to form hydrocarbons and carbon-monoxide gas. The front of these furnaces is kept tightly closed by the movable doors $y$, which are only opened when the grates are cleaned and the cinders removed. The furnace A is supplied with a steam-pipe, $x'$, which by its jet carries air forward to support combustion. The furnace B is supplied by the air-blast pipe $x$. These furnaces as well as the main portion surrounding the re-enforcers are covered by sheet-iron, (not shown in the drawings,) to prevent gas-leakage. Fresh air is supplied for burning the gas from A through the pipes $g'$. It is forced under pressure, if necessary. The several flue-gates are made to fit and work vertically. They are of one piece of fire-clay tile. The walls of the furnace are built with dead-air spaces $r$ $r$, to prevent loss of heat by radiation. Nine inches everywhere next to fire consist of good fire-brick. Outside of the air-spaces common brick are employed. The tile in the re-enforcers are supported partly by a narrow shoulder in the wall, and by bridges of arched tile $z'$ $z'$, each bridge consisting of two arch-shaped tile, as shown in Fig. 6, held up by a pier-tile in the center of the arch. The flue-tile are set in their places without mortar, and breaking joints, as indicated in the drawings.

When a new furnace is started, it is gradually heated for two or three days until it is brought up to a high heat. The sump P is then filled with base bullion to the level of the lower part of the water-jacket, onto which the ore, first being made hot, is fed in gradually until the retort C is full. During the filling up the superheated carbon monoxide is kept on under full pressure, and the furnace, once being full, is prepared to run continuously.

In this process of treating zinc ores the residuum product after the zinc is expelled is not taken out dry, as in the ordinary smelting of zinc. The ores are so combined, or a mixture is so made, that the iron and silica or alumina shall combine to produce a liquid slag, which floats upon the sump of molten lead. The slag contact with the lead extracts much of the gold and silver from the slag. The slag is drawn off from time to time, as required, and if found to be sufficiently rich in gold or silver it is subsequently treated for the extraction of these metals. A portion of the lead in the ore is sublimated with the zinc; but where the ore contains above fifteen per cent. of this metal much of it reduces and settles as metallic lead, passing through the slag-body and carrying with it the silver and gold—if the ores contain these metals—into the base bullion below.

Having thus fully described my invention, what I claim as new, and wish to secure by Letters Patent, is—

1. In a furnace for reducing and distilling zinc from its ores, and for reducing and smelting other ores, the gas-tight retort and smelting-furnace C, in combination with the fire-clay-lined water-jacket and gas-tight feed-hopper with revolving half-top, in combination with the feed-bell and circular water-jacket, constructed and operated as set forth and exhibited.

2. In a furnace for reducing and distilling zinc from its ores, and for reducing and smelting other ores, the re-enforcers D and D', constructed and operated as set forth, in combination with the independent furnaces, or gas-producers A and B, and in combination with the retort and smelting-furnace C, communicating therewith through the fire-clay pipes or tuyeres $o$ $o$ $o$ $o$, all substantially as shown, and for the purpose specified.

3. In a furnace for reducing and distilling zinc from its ores, and for reducing and smelting other ores, a fire-tile and non-conducting lining $z$, penetrating the water-jacket and communicating between the heated-gas conduits $o$ $o$ $o$ $o$ and the interior of the water-jacket, as shown and set forth.

4. In a furnace for reducing and distilling zinc from its ores, and for reducing and smelting other ores, a gas-tight retort and smelting-furnace, C, placed above the re-enforcers D and D', constructed to communicate with the gas-producers A and B through the re-enforcers D and D' by the gates $a$ $a'$ $c$ $c'$ $d$ $d'$ and the tuyere-pipes $o$ $o$ $o$ $o$, all as exhibited, and for the purposes herein specified.

5. In a furnace for reducing and distilling zinc from its ores, and for reducing and smelting other ores, the blast-pipe $x$, communicating with the retort or furnace C through the gas-producer B, and the gates $c$ $c'$, and the re-enforcers D D', and the gates $d$ $d'$, and the tuyere-pipes $o$ $o$ $o$ $o$, and the tile-lined apertures $z$ $z$, all as shown and as herein specified.

CHARLES H. MURRAY.

Witnesses:
C. O. SHIELDS,
W. R. RUST.